DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 24, 1970

871 O.G. 1023

T871,008

FIBER-FORMING POLYESTER COMPOSITIONS HAVING IMPROVED SPINNABILITY

William M. McSpadden, Jr., P.O. Box 511, Kingsport, Tenn. 37662

Continuation of application Ser. No. 707,986, Feb. 26, 1968. This application Sept. 24, 1969, Ser. No. 860,839

Int. Cl. C08g *17/00, 39/02*

U.S. Cl. 260—22

No Drawing. 11 Pages Specification

Fiber-forming polyester compositions having improved spinnability are obtained by incorporating about 0.01–1.00% by weight of certain spinning additives therein. The resulting composition may be conventionally melt-spun into filaments with reduced slubbing. The spinning additives considered effective for this purpose include alkyl stearates (such as methyl stearate), pentaerythritol tetrastearate, polyoxyethylene fatty alcohols, alkali metal di(alkyl) phosphates (such as sodium di(2-ethyl-hexyl) phosphate), calcium stearate, alkali metal stearates and dialkyl siloxanes. The fiber-forming polyesters with which this invention is concerned are those derived from at least one difunctional dihydroxy compound (such as a difunctional diol) and at least one difunctional dicarboxylic acid. Preferred polyesters are poly(ethylene-terephthalate) and those derived from 1,4-cyclohexanedimethanol and terephthalic or isophthalate acid. Other materials, such as pigments (such as $TiO_2$), brighteners (such as 2,2′-(vinylene-di-p-phenylene)bisbenzoxazole), stabilizers, fillers, inhibitors, processing agents, and the like, which are conventionally added to the polyester melt prior to spinning may also be introduced into the polyester melt either before, after, or at the same time as the spinning additives. The spinning additives as well as any other additives should be substantially dry before being introduced to the polyester melt.